Figure 1:
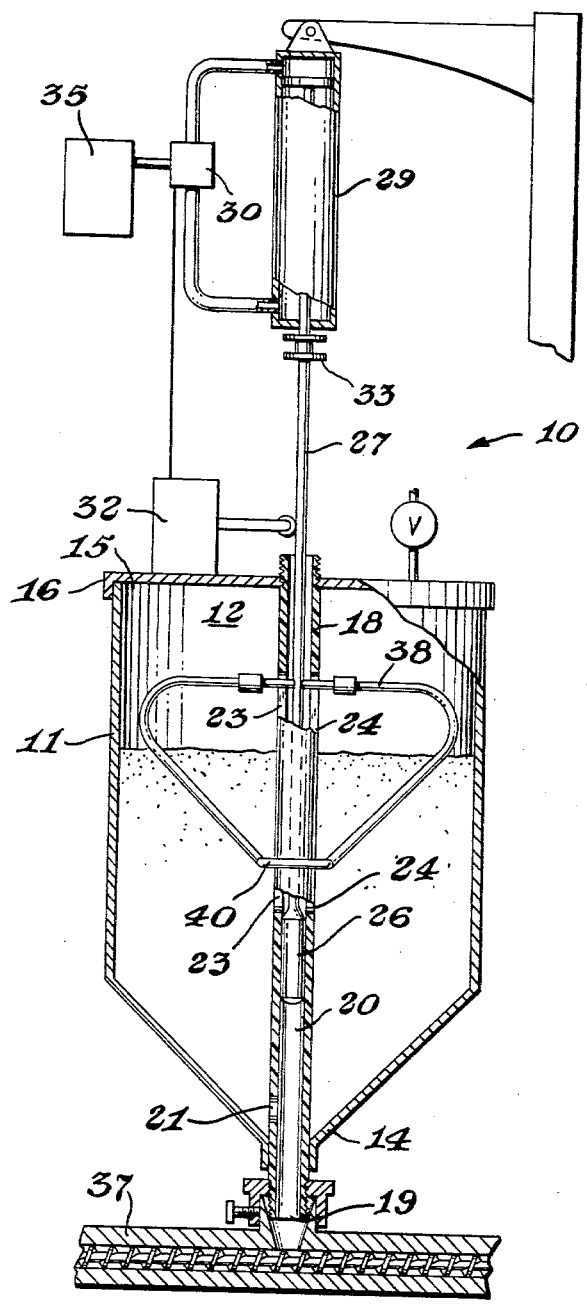

March 1, 1966     J. W. WATTS ETAL     3,237,813

APPARATUS FOR FEEDING POWDER

Filed Sept. 29, 1964

INVENTORS.
Jerry W. Watts
Earl J. Rothermel, Jr.
BY
ATTORNEY

United States Patent Office 3,237,813
Patented Mar. 1, 1966

3,237,813
APPARATUS FOR FEEDING POWDER
Jerry W. Watts, East Baton Rouge, and Earl J. Rothermel, Jr., Baker, La., assignors to The Dow Chemical Company, Midland, Mich., a corporation of Delaware
Filed Sept. 29, 1964, Ser. No. 400,045
2 Claims. (Cl. 222—246)

This invention relates to an apparatus for feeding and forming low bulk density materials. It more particularly relates to an apparatus for feeding and shaping of low bulk density thermoplastic resinous materials.

Certain thermoplastic resinous materials are prepared by polymerizing a monomeric material under conditions that result in the formation of a light, low bulk density fluffy powder which in many respects is similar to flour. Oftentimes it is desirable to mold or extrude such a powder into a finished article. However, in order to accomplish this in most conventional equipment, it is necessary to pre-compact the polymeric material into a form which can be readily handled. Oftentimes such light fluffy polymer has a density in the range of 8–15 pounds per cubic foot and must be pre-compacted to densities in the region of 25–30 pounds per cubic foot before a satisfactory operation is achieved. Without such pre-compaction, oftentimes the molded or extruded products show the presence of air bubbles and production rates are usually substantially lower than with predensified material.

It is an object of this invention to provide an improved apparatus for feeding low bulk density thermoplastic resinous materials such as polyolefins.

A further object of this invention is to provide an improved feeding hopper whereby light, fluffy materials of low bulk density are directly fed to an extrusion apparatus.

Another object of the invention is to provide an apparatus for the elimination of a separate predensifying step.

These benefits and other advantages in accordance with the present invention are readily achieved employing an apparatus in accordance with the invention comprising a powder container defining an internal cavity, a conduit having an internal surface a piston therein, the piston adapted to cooperate with the internal surface of the conduit passage in powder sealing engagement therewith, the conduit defining a second passageway, the second passageway being in communication with the internal cavity of the powder container, the conduit, terminating in an exit opening remotely disposed from the piston and generally adjacent the second passageway, means to agitate powder within the internal cavity, means to reciprocally move the piston within the conduit.

Figure 2:
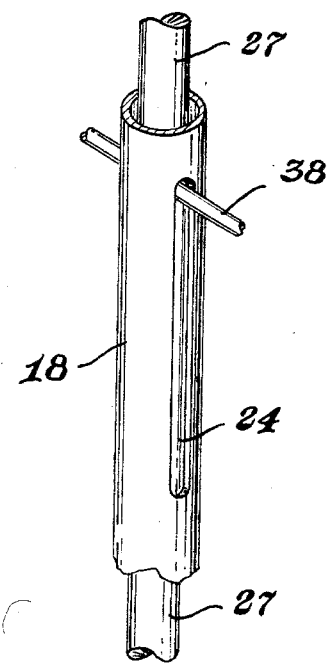

Further features and other advantages of the present invention will become more apparent when the following specification is taken in view of the drawing wherein:

FIGURE 1 is a schematic sectional representation of an apparatus in accordance with the invention;
FIGURE 2 is a fragmentary view of a portion of the apparatus of FIGURE 1.

In FIGURE 1 there is shown a schematic sectional view of an apparatus generally designated by the reference numeral 10. The apparatus 10 comprises in cooperative combination a powder containing means or hopper 11 defining a cavity 12, the hopper 11 has a conical discharge or lower end 14 and an upper open end 15. The open end 15 is fitted with a closure 16. A conduit 18 is centrally disposed within the hopper 11. The conduit 18 passes through the discharge end 14 of the hopper and terminates in a discharge port 19. The conduit 18 defines an internal passageway 20 and a communication passageway 21 which provides communication between the cavity 12 and the passageway 20 adjacent the lower end 14 of the hopper 11. The conduit 18 defines a pair of longitudinally extending slots 23 and 24 remotely spaced from the communication passageway 21. A piston 26 is disposed within the passageway 20 and is a sliding fit therefor. A piston rod 27 is secured to the piston 26 and is in operative combination with a linear actuator or air cylinder 29. The air cylinder 29 is activated by a control assembly 30 which is controlled by a switch 32 which in turn is actuated by a collar 33 disposed on the piston rod 27. The control assembly 30 is in communication with a compressed air supply 35. An extruder 37 is in operative communication with the discharge port 19 of the conduit 18. An agitator 38 is secured to the piston rod 27, and passes through the slots 23 and 24. The agitator 38 defines a guide ring 40 which encircles the conduit 18.

FIGURE 2 is a fragmentary view of the conduit 18 illustrating the slot 24, a portion of the piston rod 27 and a section of the agitator 38. In operation of the apparatus of FIGURE 1 the light, fluffy powder to be fed to the extruder 37 is placed within the cavity 12 of the hopper 11. The control 30 is so constructed and arranged as to cause the air cylinder 29 to force the piston 26 toward the outlet 21. When the collar 33 engages the switch 32, the control 30 causes the cylinder to retract the piston rapidly from the discharge port 19. When the air cylinder has withdrawn the piston from the port 19 to the maximum extent the air pressure is reversed and the piston forced again toward the port 19. Thus without powder in the system the piston 26 will reciprocate within the passage 20 at a rate determined by the constants of the air cylinder and the control mechanism. With powder in the hopper the movement of the piston 26 away from the port 19 causes the powder to flow into the passageway 20 through the port 21. As the piston 26 moves toward the port 19 the powder is compressed or compacted. The degree of compaction is controlled to a major extent by the force applied by the piston 26 when the passageway 20 has sufficient compacted powder therein the travel of the piston is limited by the rate of removal of the compacted powder by the extruder 37.

In operation of apparatus in accordance with the invention, generally it is desirable that the piston be withdrawn relatively rapidly and pressure applied to the powder without undue delay. Experimentally it is found when a return stroke, that is, withdrawal of the piston from the port 19 requires periods from 1–2 seconds, no variation is observed in extruder output. Apparatus substantially as illustrated in FIGURE 1 is found to feed finely powdered low density polyethylene at a weight rate and eliminates the need for precompressing or compacting powders having bulk densities in the range of 10 pounds per cubic boot. Beneficially with extremely light powders it is often advantageous reduce the pressure in the hopper to below atmospheric. However, for most applications such a procedure is not essential, as the sliding fit of the piston 26 readily permits gas to pass through the conduit 18. Reduced pressure is particularly valuable when employing powders that fluidize very rapidly.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A powder compacting and dispensing apparatus comprising,
   a hopper, the hopper so constructed and arranged so as to define an internal cavity adapted to receive powder within, the hopper having a tapering bottom portion,
   a conduit disposed at least in part within the cavity, the conduit having a wall and an internal passageway, the conduit defining powder passageway providing communication between the internal cavity of the hopper and the internal passageway of the conduit, the conduit having an exit opening in full communication with the internal passageway generally adjacent the powder passageway, the exit passageway being disposed adjacent the bottom of the hopper and providing communication with space external to the hopper, the conduit defining at least one longitudinal slot remotely disposed from the exit opening and adapted to slideably pass an agitator,
   a piston having a piston rod disposed within the conduit, the piston being in powder sealing engagement with the internal wall of the conduit,
   an agitator affixed to the piston rod, the agitator extending into the internal cavity and projecting toward the bottom of the hopper, the agitator being so constructed and arranged that it is disposed generally adjacent the bottom of the hopper when the piston is adjacent the bottom of the hopper,
   a pneumatic cylinder in cooperative combination with the piston rod and adapted to reciprocate the piston within the conduit toward and away from the bottom of the hopper and,
   means to reverse the motion of the piston when the piston reaches pre-determined positions.
2. The apparatus of claim 1 wherein the powder hopper is substantially totally enclosed.

References Cited by the Examiner
UNITED STATES PATENTS

| | | | |
|---|---|---|---|
| 1,654,673 | 1/1928 | Barks | 222—334 |
| 2,124,580 | 7/1938 | Lavine | 222—246 X |
| 2,552,195 | 5/1951 | Lopata | 222—33 X |
| 2,933,175 | 4/1960 | Gray. | |

M. HENSON WOOD, JR., *Primary Examiner.*

LOUIS J. DEMBO, *Examiner.*